United States Patent [19]

Sawada et al.

[11] Patent Number: 5,709,966
[45] Date of Patent: Jan. 20, 1998

[54] BATTERY

[75] Inventors: Kazunobu Sawada, Toyota; Takaki Kamio, Kariya; Katsumi Yamada, Nishio; Muneharu Mizutani, Toyohashi; Yuuki Fujitani, Nagoya; Masatoshi Miwa, Oobu, all of Japan

[73] Assignee: Aisin Seiki Kabushiki Kaisha, Kariya, Japan

[21] Appl. No.: 562,020

[22] Filed: Nov. 22, 1995

[30] Foreign Application Priority Data

Nov. 29, 1994 [JP] Japan .................. 6-295016

[51] Int. Cl.$^6$ .................. H01M 2/24; H01M 6/42; H01M 6/46
[52] U.S. Cl. .................. 429/160; 429/152; 429/153
[58] Field of Search .................. 429/152, 153, 429/160

[56] References Cited

U.S. PATENT DOCUMENTS 1,919,902  7/1933  Nyce .................. 429/160

FOREIGN PATENT DOCUMENTS 4-137356  5/1992  Japan .
5-159769  6/1993  Japan .
2098383  11/1982  United Kingdom .

Primary Examiner—Kathryn L. Gorgos
Assistant Examiner—Edna Wong
Attorney, Agent, or Firm—Oblon, Spivak, McClelland, Maier & Neustadt, P.C.

[57] ABSTRACT

A lead-acid battery includes cell rooms in which cells are stored and a partition wall separating the cell rooms. The cell rooms include an electrode plate assembly having electrode plates facing each other with a separator sandwiched between the electrode plates, and positive and negative straps extending in a laminated direction of the electrode plates in a bar shape. The positive and negative straps are connected in parallel with lug portions of the electrode plates. An intercell electrically connecting member having a H-shaped cross-section and formed of a lead-based material is held by the partition wall to interconnect cells in adjacent cell rooms. The intercell electrically connecting member has a first butting end surface in a flat plane shape butt welded to the positive strap, and a second butting end surface in a flat plane shape butt welded to the negative strap. Butting connection of the intercell electrically connecting member and each of the positive and negative straps improves their connecting strength.

29 Claims, 8 Drawing Sheets

( PRIOR ART )

BATTERY

BACKGROUND OF THE INVENTION

1. Field of the Invention

This invention relates to a battery, and is applicable, for example, to a lead-acid battery.

2. Description of the Related Art

A lead-acid battery as an example of batteries will be described. Japanese Unexamined Patent Publication (KOKAI) No. 4-137,356 discloses a lead-acid battery comprising, as shown in FIG. 21, a battery container 102 having cell rooms 100, cells 200 comprising electrode plate assemblies 200a stored in the cell rooms 100, and an intercell electrically connecting member 300 formed of a conductive material and held in the middle of a partition wall 106 of the cell rooms 100.

The intercell electrically connecting member 300 is provided with horizontal projections 301 and 302. Lug portions 202 of positive electrode plates 201 in one of adjoining two cells are laid on and overlapped with one projection 301. In a similar way, lug portions 205 of negative electrode plates 204 in the other of the adjoining two cells are laid on and overlapped with the other projection 302. The overlapping portions are welded together by laser beam, whereby the intercell electrically connecting member 300 is connected to the positive electrode plates 201 and the negative electrode plates 204. Thus, the intercell electrically connecting member 300 electrically connects adjoining two cells.

In the above-described art, the lug portions 202 are laid on and overlapped with the projection 301 of the intercell electrically connecting member 300, and the lug portions 205 are laid on and overlapped with the other projection 302. These overlapping portions are welded together by laser beam.

When this overlapping method is employed, the height of the projections 301 and 302 of the intercell electrically connecting member 300 must be correctly adjusted with the height of the lug portions 202 and 205. When adjustment is not correct, inconveniences arise such that the lug portions 202 cannot be laid on the projection 301 of the intercell electrically connecting member 300, the lug portions 205 cannot be laid on the projection 302, and the like. As a result, there arises a problem that the connecting strength of the intercell electrically connecting member 300 and the lug portions 202 and 205 is difficult to be secured.

In particular, as shown in FIG. 21, when the lug portions 205 are formed at one end of one electrode plate assembly 200a constituting a cell 200, and the lug portions 202 are formed at the other end of the electrode plate assembly 200a, the lug portions 202 on one side are difficult to be disposed on the projection 301 after the lug portions 205 on the other side are placed on the projection 302. As a result, there arises a problem that it is not easy to secure the connecting strength of the intercell electrically connecting member 300 and the lug portions 202 and 205.

Therefore, when the electrode plates are expanded or contracted due to corrosion, or vibrations or some external force are applied to the battery, there is a fear that the connecting portions are damaged or, in some cases, broken off.

Further, sealing performance at the boundary between the intercell electrically connecting member 300 and the partition wall 106 is not always sufficient. Consequently, electrolyte sometimes enters into the boundary between the intercell electrically connecting member 300 and the partition wall 106, so that this entered electrolyte along with the electrolyte in the adjoining two cell rooms 100 causes cells 200 in the adjoining two cell rooms 100 to be short circuited. This is disadvantageous in producing required voltage.

Further, in using this battery, particularly at the time of charging or discharging the battery, active materials of the electrode plates are sometimes dropped and deposited on bottom surfaces 100c of the cell rooms 100. The deposited active materials sometimes causes the positive electrode plates and the negative electrode plates of the electrode plate assembly 200a to be short-circuited. This is not preferable in obtaining required performance of a lead-acid battery.

SUMMARY OF THE INVENTION

The present invention has been conceived under the above-described circumstances.

It is a general object of the present invention to provide a battery which is advantageous in securing connecting strength at an intercell electrically connecting member held by a partition wall.

It is a more specific object of the present invention to provide a battery which is advantageous in securing the connecting area of an intercell electrically connecting member and each current collector, and in securing the connecting strength of the intercell electrically connecting member and each current collector, by employing a method in which the current collectors are respectively butt connected to butting end surfaces formed on the intercell electrically connecting member.

It is another object of the present invention to provide a battery which is advantageous in securing connecting strength at an intercell electrically connecting member, the strength of holding the intercell electrically connecting member by a partition wall, and sealing performance at the boundary between the intercell electrically connecting member and the partition wall, by rendering a H-shaped cross section to the intercell electrically connecting member, and increasing the area of a first butting end surface and a second butting end surface of the intercell electrically connecting member.

It is a still another object of the present invention to provide a battery which is advantageous in securing the connecting strength of an intercell electrically connecting member and electrode plates in a cell, by burying lug portions of the electrode plates in the intercell electrically connecting member.

It is a further object of the present invention to provide a battery which is advantageous in improving sealing performance at the boundary between a partition wall and an intercell electrically connecting member, by integrally forming the partition wall and the intercell electrically connecting member.

It is a still further object of the present invention to provide a battery which is advantageous in improving sealing performance at the boundary between a partition wall and an intercell electrically connecting member, so that cells in adjoining two cell rooms are suppressed from being short circuited, and required voltage is secured.

It is another object of the present invention to provide a battery which is advantageous in suppressing a fluid sealant from spreading excessively by the baffle plate effect of a projection formed on a partition wall, and in securing the strength of the intercell electrically connecting member holding area of the partition wall by the rib effect of the projection.

It is a further object of the present invention to provide a battery which is advantageous in preventing short circuit even when active materials are dropped and deposited on a bottom surface of a cell room.

A battery according to the present invention comprises:

a container having a plurality of cell rooms and a partition wall for separating adjoining cell rooms;

cells stored respectively in the cell rooms of the container, and respectively comprising an electrode plate assembly having a separator and electrode plates which are laminated so as to face to each other with the separator sandwiched therebetween;

a first current collector which is electrically connected to electrode plates in one of two cells adjoining through the partition wall;

a second current collector which is electrically connected to electrode plates in the other of the two cells adjoining through the partition wall; and an intercell electrically connecting member held by the partition wall, formed of a conductive material, and electrically connecting the cells adjoining through the partition wall in series or in parallel, the intercell electrically connecting member comprising:

a first butting end surface in an approximately flat plane shape disposed along by one surface of said partition wall, and connected to the first current collector with the first butting end surface and the first current collector butting against each other; and a second butting end surface in an approximately flat plane shape disposed back to back with the first butting end surface and along by the other surface of the partition wall, and connected to the second current collector with the second butting end surface and the second current collector butting against each other.

The approximately flat plane shape means shape having a flat plane surface, and includes shapes having concaves or convexes in addition to the flat plane surface, as shown in FIGS. 7 and 8.

According to the present invention, electrode plate assemblies in two cells adjoining through the partition wall are connected to each other by way of the intercell electrically connecting member.

According to the present invention, the first butting end surface and the second butting end surface are disposed along by the partition wall, and increased in area. Therefore, the connecting area of the intercell electrically connecting member and each of the current collectors can be secured. Further, in connection, at least one of the intercell electrically connecting member and each of the current collectors can be relatively displaced with respect to each other in the extending direction of the partition wall, so that they are placed at appropriate connecting positions.

Therefore, this construction is advantageous in securing the connecting strength of the intercell electrically connecting member and each of the current collectors, and in improving the durability of the connecting portions. Accordingly, even when displacement is caused due to corrosion of the electrode plates or the like, or even when vibrations or some external force is applied to the battery, the connection at the connecting portions is maintained good, and as a result it is advantageous in obtaining required performance of the battery.

According to the present invention, the intercell electrically connecting member may comprise a first side part having the first butting end surface, a second side part disposed to face to the first side part and having the second butting end surface, and a connecting part connecting an intermediate portion of the first side part and an intermediate portion of the second side part, the first side part, the second side part, and the connecting part together constituting a H-shaped cross section.

In this construction, since the intercell electrically connecting member has a H-shaped cross section, the first side part and the second side part constituting the shape of H are extended along the partition wall, and as a result, the connecting area of the first butting end surface of the first side part, and the connecting area of the second butting end surface of the second side part are increased. Therefore, as mentioned before, this construction is advantageous in securing the connecting strength of the intercell electrically connecting member and the electrode plates in the cells. Further, since the first side part and the second side part constituting the shape of H are extended along the partition wall and increased in area as mentioned before, contact area at the boundary between the intercell electrically connecting member and the partition wall is also increased, and as a result, sealing performance at the boundary between the intercell electrically connecting member and the partition wall can be secured.

Further, according to the present invention, since the intercell electrically connecting member has a H-shaped cross section, it is easy to secure the strength of holding the intercell electrically connecting member by the partition wall, and accordingly it is advantageous in preventing the intercell electrically connecting member held by the partition wall from being displace or loosened, even when vibrations or some external force is applied to the battery. Therefore, sealing performance at the boundary between the intercell electrically connecting member and the partition wall is further secured.

A battery according to the present invention may comprise:

a container having cell rooms and a partition wall for separating adjoining cell rooms;

cells stored respectively in the cell rooms of the container, and having electrode plates which face to each other with the separator sandwiched therebetween; and an intercell electrically connecting member held by the partition wall, formed of a conductive material, and electrically connecting cells adjoining through the partition wall in series or in parallel, the intercell electrically connecting member comprising a first side part disposed on the side of one of two adjoining cells and electrically connected to electrode plates in the one cell, a second side part disposed on the side of the other of two adjoining cells and electrically connected to electrode plates in the other cell, and a connecting part connecting an intermediate portion of the first side part and an intermediate portion of the second side part, the first side part, the second side part, and the connecting part together constituting a H-shaped cross section.

In this construction according to the present invention, since the intercell electrically connecting member has a H-shaped cross section, the first side part and the second side part constituting the shape of H are extended along the partition wall and increased in area. Accordingly, it is advantageous in securing the connecting strength of the intercell electrically connecting member and the electrode plates. In addition, it is advantageous in securing sealing performance at the boundary between the intercell electrically connecting member and the partition wall. Further, it is easy to secure the strength of holding the intercell electrically connecting member by the partition wall, and sealing performance at the boundary between the intercell electrically connecting member and the partition wall is more effectively secured.

A battery according to the present invention may comprise a container having cell rooms, and an electrically insulating partition wall for separating adjoining cell rooms, cells stored respectively in the cell rooms of the container and respectively comprising an electrode plate assembly having electrode plates which have a lug portion and face to each other with a separator sandwiched therebetween, intercell electrically connecting member held by the partition wall, formed of a conductive material, and electrically connecting cells adjoining through the partition wall in series or in parallel, the lug portions of the electrode plates being buried in the intercell electrically connecting member.

In this construction according to the present invention, since the lug portions of the electrode plates of the electrode plate assembly are buried in the intercell electrically connecting member, the connecting strength of the lug portions and the intercell electrically connecting member are secured. Especially when molten metal to be formed into the intercell electrically connecting member surrounds the lug portions, it is possible to expect an effect of fastening the lug portions by the intercell electrically connecting member owing to solidifying shrinkage, and therefore, the connecting strength of the lug portions and the intercell electrically connecting members can be further secured.

In the battery according to the present invention, the partition wall and the intercell electrically connecting member may be integrally formed by introducing resin in a cavity of a mold for forming a partition wall with the intercell electrically connecting member placed in this cavity, so that the integrity of the partition wall and the intercell electrically connecting member is enhanced.

In this construction according to the present invention, since the partition wall and the intercell electrically connecting member are integrally formed by introducing resin in a cavity of a mold for forming a partition wall with the intercell electrically connecting member placed in this cavity, the integrity of the partition wall of the container and the intercell electrically connecting member is improved. Accordingly, sealing performance at the boundary between the intercell electrically connecting member and the partition wall is much enhanced. Therefore, this construction is advantageous in preventing electrolyte from entering into the boundary between the intercell electrically connecting member and the partition wall, and as a result, in suppressing short circuit between cells in the adjoining cell rooms caused by the entered electrolyte, and in securing required voltage.

In the battery of the present invention, a sealing member may be disposed at the boundary between the intercell electrically connecting member and the partition wall.

In this construction according to the present invention, since the sealing member is disposed at the boundary between the intercell electrically connecting member and the partition wall, sealing performance at the boundary between the intercell electrically connecting member and the partition wall is enhanced. Therefore, this construction is also advantageous in preventing electrolyte from entering into the boundary between the intercell electrically connecting member and the partition wall, and as a result, in suppressing short circuit between cells in the adjoining cell rooms caused by the entered electrolyte, and accordingly in securing required voltage.

In the battery according to the present invention, the sealing member may be formed by solidifying a fluid sealant, and the partition wall may be provided with a projection for preventing the fluid sealant from spreading excessively.

In this construction according to the present invention, since the projection of the partition wall can suppress the fluid sealant from spreading excessively, the sealant can be applied with a high reliability. In this respect, it is further advantageous in securing sealing performance at the boundary between the intercell electrically connecting member and the partition wall.

In the battery according to the present invention, the electrode plates constituting the electrode plate assembly may be held in a manner in which a gap is formed between the electrode plates and a bottom surface of the cell room of the container.

In this construction according to the present invention, since the electrode plates constituting the electrode plate assembly are held in a manner in which a gap is formed between the electrode plates and a bottom surface of the cell room of the container, it is advantageous in preventing short circuit even when active materials and the like are dropped and deposited on the bottom surface of the cell room.

BRIEF DESCRIPTION OF THE DRAWINGS

Other objects and features of the invention will become apparent to those skilled in the art as the disclosure is made in the following description of preferred embodiments of the invention, as illustrated in the accompanying sheets of drawings, in which.

PREFERRED EMBODIMENTS OF THE PRESENT INVENTION

Preferred embodiments of the present invention will be described hereinafter. Batteries of these preferred embodiments are about 12-V lead-acid batteries to be mounted on automobiles. The electrochemical system of the respective lead-acid batteries consists of lead peroxide ($PbO_2$) for positive electrodes, lead (Pb) for negative electrodes, and a solution of sulfuric acid ($H_2SO_4$) for electrolyte.

First Preferred Embodiment

Figure 1:
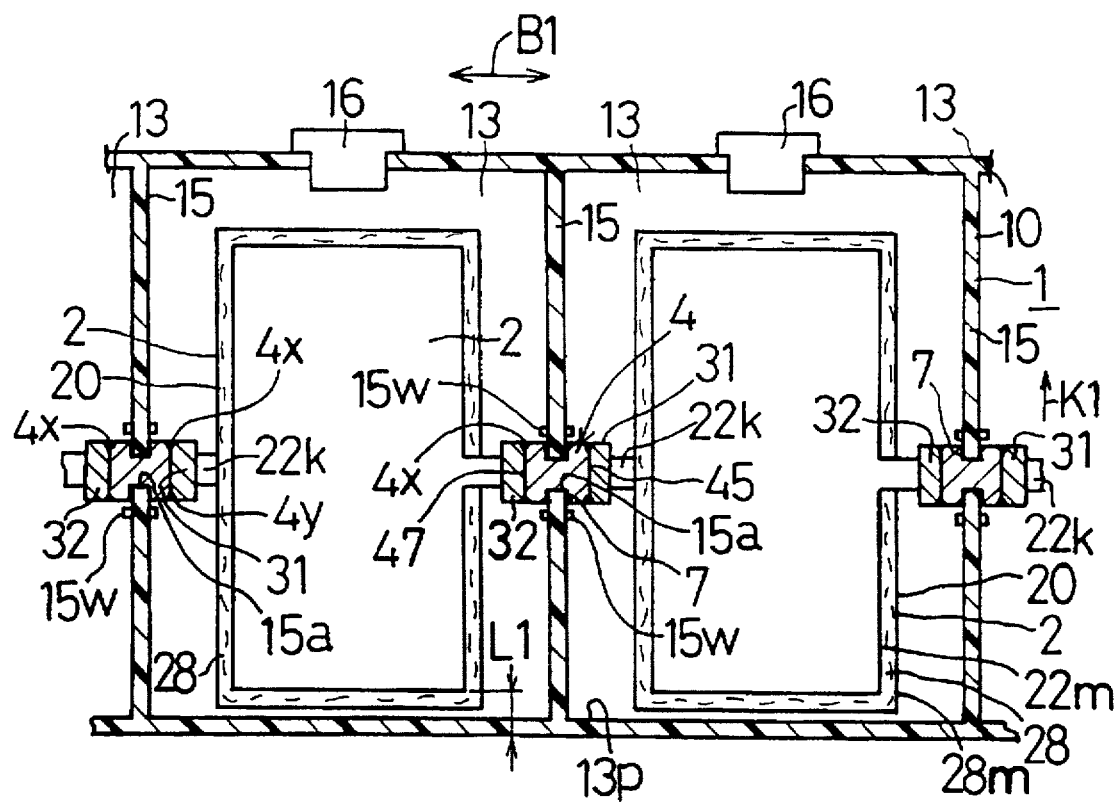
FIG. 1 is a vertical sectional view of the relevant parts of a lead-acid battery according to a first preferred embodiment of the present invention.

FIG. 1 shows the relevant parts of a lead-acid battery according to a first preferred embodiment of the present invention. Referring to FIG. 1, a battery container 1 is formed of resin such as ABS resin, polyethylene, and polypropylene, and electrically insulated. The battery container 1 comprises an integrally formed battery container body 10, and a lid 12 put on an opening of the battery container body 10 (see FIG. 5). The battery container body 10 comprises several cell rooms 13, and resin partition walls 15 for respectively separating adjoining two cell rooms 13.

In the middle of each partition wall 15 there is a holding opening 15a in a slot shape which extends in a perpendicular direction to the plane of paper showing FIG. 1. The battery container 1 is provided with sealing caps 16 each having a pressure relief valve for releasing gas which generates at the time of charging the battery and the like.

Cells 2 are respectively stored in the cell rooms 13. Each cell 2 comprises an electrode plate assembly 20. In this preferred embodiment, each cell 2 basically has the output of 2 V, but voltage output of each cell of other kinds of batteries is not limited to 2 V.

Figure 3:
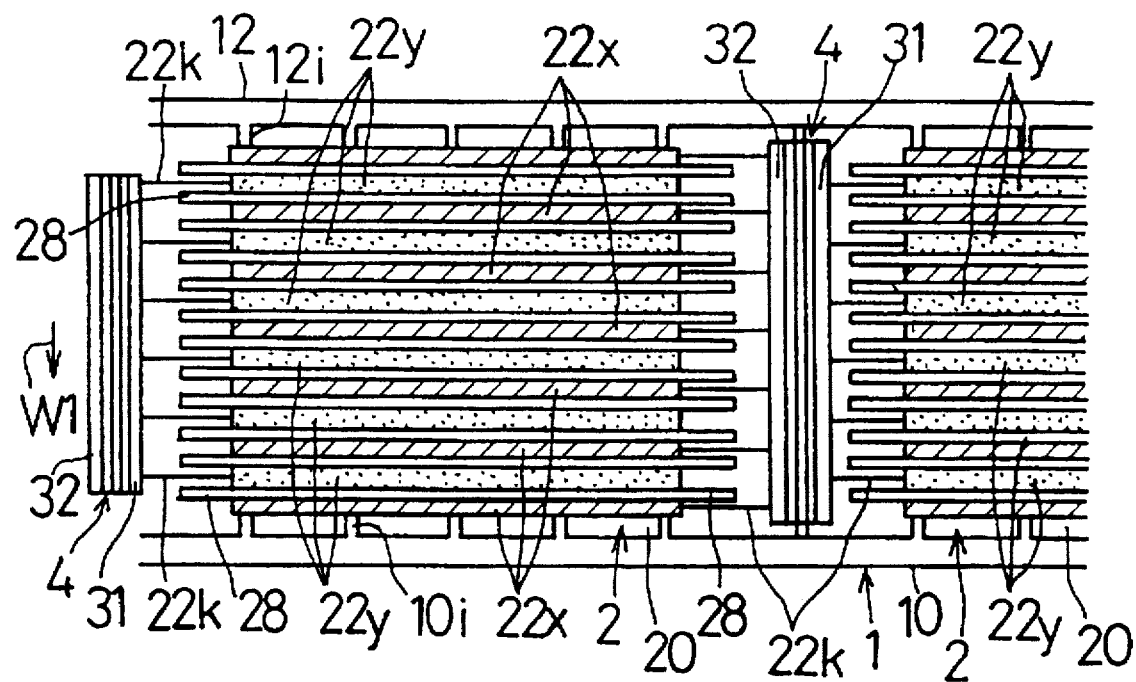
FIG. 3 is a cross sectional view showing the lamination of electrode plate assemblies of the lead-acid battery according to the first preferred embodiment of the present invention.
Figure 4:
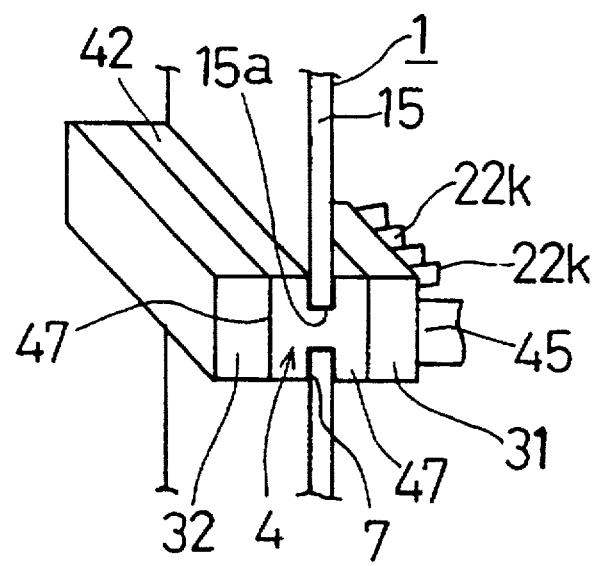
FIG. 4 is a perspective side view of the vicinity of the intercell electrically connecting member according to the first preferred embodiment of the present invention.

As shown in FIG. 3, each electrode plate assembly 20 comprises a pair of positive electrode plates 22y and negative electrode plates 22x which are alternately arranged 50 as face each other with an insulating separator 28 in a sheet shape sandwiched therebetween. Hereinafter, the term 'electrode plates 22' includes the positive electrode plates 22y and the negative electrode plates 22x. Typically, each positive electrode plate 22y is produced by pasting lead peroxide ($PbO_2$), which is an active material, to a grid or framework. On the other hand, each negative electrode plate is generally produced by pasting spongy lead (Pb), which is an active material, to a grid.

Each separator 28 intervening between one positive electrode plate 22y and one negative electrode plate 22x can be formed of stable materials to the electrolyte, i.e., a solution of sulfuric acid, such as a glass mat, which is an aggregation of glass fibers, and porous resin. Each separator 28 serves to prevent the adjoining positive electrode plate 22y and negative electrode plate 22x from being directly short-circuited, while allowing the electrolyte to permeate itself. It must be noted that the electrode plates 22 have sides 22m defining their outer shape, and the separators 28 have sides 28m which exist outside of the sides 22m in order to prevent short circuit.

In this preferred embodiment, the area of each electrode plate 22 is set to be smaller than that of a conventional electrode plate, and in compensation for that, the number of electrode plates 22 is increased. This construction helps to reduce the internal resistance of the lead-acid battery.

Each positive strap 31 as a first current collector is formed of lead or a lead alloy in a rectangular cross section, and extended in a bar shape in the laminated direction of the electrode plate assembly 20, that is, in the direction of the arrow W1 in FIG. 3. The positive strap 31 is in contact with a lug portion 22k of each positive plate 22y of each cell 2, thereby electrically connected to the lug portion 22k. Thus, the positive strap 31 functions to collect current from each positive plate 22y. In this case, the lug portions 22k in a tongue shape can be connected to the positive strap 31 by integrally burying the lug portions 22k in the positive strap 31 or by welding the lug portions 22k to the positive strap 31.

Each negative strap 32 as a second current collector is formed of lead or a lead alloy in a rectangular cross section, and extended in a bar shape in the laminated direction of the electrode plate assembly 20, that is, in the direction of the arrow W1 in FIG. 3. The negative strap 32 is in contact with a lug portion 22k of each negative plate 22x of each cell 2, thereby electrically connected to the lug portion 22k. Thus, the negative strap 32 functions to collect current from each negative plate 22x. The lug portions 22k can be connected to the negative strap 32 also by burying the lug portions 22k in the negative strap 32 or by welding the lug portions 22k to the negative strap 32.

Figure 2:
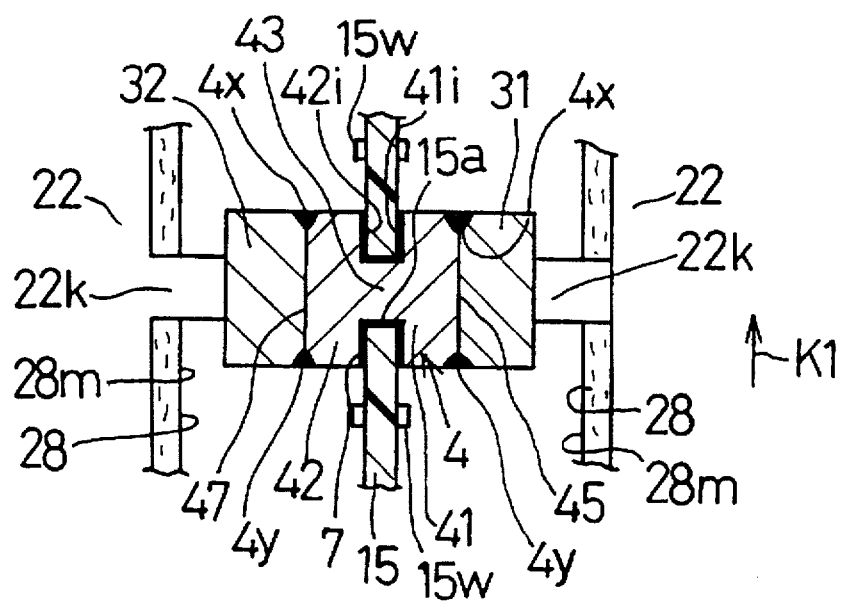
FIG. 2 is an enlarged sectional view of the vicinity of an intercell electrically connecting member according to the first preferred embodiment of the present invention.

Referring to FIG. 1, each intercell electrically connecting member 4 is formed of lead or a lead alloy, which is a conductive material. This is determined in view of stability to the electrolyte and corrosion resistance, just for the same reason why the positive strap 31 and the negative strap 32 are formed of lead or a lead alloy. The intercell electrically connecting member 4 electrically connects two cells 2 adjoining through one partition wall 15 in series. As shown in FIG. 2, the intercell electrically connecting member 4 has a H-shaped cross section, and comprises a first side part 41, a second side part 42 which faces to the first side part 41, and a connecting part 43 which connects the first side part 41 and the second side part 42. Because the cross section has the shape of H, a first butting end surface 45 formed at the first side part 41 in a flat plane shape is extended in a height direction, that is, in the direction of the arrow K1 in FIG. 1, thereby increased in area. Similarly, a second butting end surface 47 formed at the second side part 42 in a flat plane shape is extended in a height direction, thereby increased in area.

Since the intercell electrically connecting member 4 has the shape of H as described above, an inner surface 41i of the first side part 41 which faces to one partition wall 15 is increased in area, and an inner surface 42i of the second side part 42 which faces to the partition wall 15 is increased in area. This construction is advantageous in increasing the connecting area of the intercell electrically connecting member 4 and the partition wall 15, and accordingly it is easy to secure sealing performance at the boundary between the intercell electrically connecting member 4 and the partition wall 15.

The intercell electrically connecting member 4 is engaged with and held by the holding opening 15a of the partition wall 15 by being relatively displaced with respect to the partition wall 15 in a perpendicular direction to the plane of paper showing FIG. 2 in the production processes. As a result, the intercell electrically connecting member 4 is disposed in an approximately intermediate portion in the height direction of the partition wall 15, that is, in the direction of the arrow K1. As seen from FIG. 2, the first butting end surface 45 of the intercell electrically connecting member 4 is approximately in parallel with one surface of the partition wall 15. This first butting end surface 45 is welded to one end surface of the positive strap 31 in a flat plane shape, with the surfaces butting against each other.

As appreciated from FIG. 2, the second butting end surface 47 of the intercell electrically connecting member 4 is disposed back to back with the first butting end surface 45 and approximately in parallel with the other surface of the partition wall 15. This second butting end surface 47 is welded to one end surface of the negative strap 32 in a flat plane shape, with the faces butting against each other. As indicated by the cross sectional view of FIG. 2, the welding of the electrically connecting member 4 and each of the first butting end surface 45 and the second butting end surface 47 is conducted by forming an upper welding portion 4x and a lower welding portion 4y.

In welding, the positive strap 31 can be relatively displaced with respect to the intercell electrically connecting member 4 in the extending direction of the partition wall 15, i.e., in the direction of the arrow K1, or in other words, in the extending direction of the first butting end surface 45. Similarly, the negative strap 32 can be relatively displaced with respect to the intercell electrically connecting member 4 in the extending direction of the partition wall 15, i.e., in the direction of the arrow K1, in other words, in the extending direction of the second butting end surface 47. The relative displacement of the positive and negative straps 31 and 32 enables these straps 31 and 32 to be welded at appropriate positions.

Welding was conducted by the TIG (tungsten inert gas) welding method by inserting a welding torch into the cell rooms 13. However, the welding means is not limited to the TIG welding method, and any known welding method can be applied such as MIG (metal electrode inert gas) welding, laser beam welding, electron beam welding, electrical resistance welding, induction welding, and ultrasonic welding.

In this preferred embodiment, output of the electrode plate assembly 20 in one cell 2 is basically 2V, but required voltage (for example, 12V) can be obtained, because the electrode plate assemblies 20 in the cells 2 adjoining through the partition walls 15 are electrically connected to each other in series as a result of the above-described butt welding.

In the above-described butt welding, since the butting direction of the arrow B1 in FIG. 1 is the surface direction of the electrode plates 22 which constitute each cell 2, displacement allowance in the surface direction helps to achieve superior butting.

As shown in FIG. 2, between the intercell electrically connecting member 4 and the partition wall 15, there are sealing members 7 formed of resin or other materials which are resistant to the electrolyte, that is, a solution of sulfuric acid. Thus, sealing performance at the boundary between the intercell electrically connecting member 4 and the partition wall 15 is further secured.

In this preferred embodiment, the sealing members 7 are formed in the production processes by laying the partition wall 15 horizontally and injecting and solidifying a liquid sealant. At this time, rib projections 15w formed near the holding opening 15a of the partition wall 15 exhibit a similar function to baffle plates and suppress the liquid sealant from spreading excessively. So, the provision of the projections 15w is advantageous in applying a liquid sealant, and in this respect, helps to secure sealing reliability at the boundary between the intercell electrically connecting member 4 and the partition wall 15.

Further, since the projections 15w are expected to exhibit a rib effect of reinforcing the peripheries of the holding opening 15a of the partition wall 15, the provision of the projections 15w is advantageous in preventing deflecting deformation of a part of partition wall 15 which holds the intercell electrically connecting member 4. In this respect, the strength of holding the intercell electrically connecting member 4 by the partition wall 15 is secured. Further, since this construction is advantageous in suppressing deflection of the part of partition wall 15 which holds the intercell electrically connecting member 4, excessive displacement of the partition wall 15 and the intercell electrically connecting member 4 with respect to each other can be reduced or prevented. In this respect, this construction is further advantageous in securing sealing performance at the boundary between the intercell electrically connecting member 4 and the partition wall 15.

In this preferred embodiment, the electrolyte is a solution of sulfuric acid. The electrolyte is introduced around or slightly over upper ends of the electrode plate assemblies 20.

Figure 5:
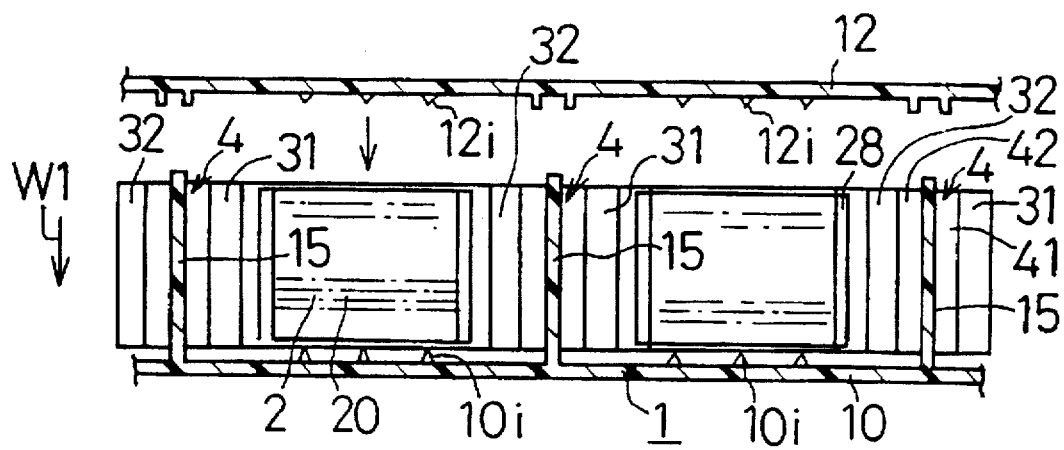
FIG. 5 is a schematic sectional view showing the way of putting on a lid to a battery container body according to the first preferred embodiment of the present invention.

By the way, active materials on the electrode plates 22 are sometimes dropped in using a lead-acid battery, particularly at the time of charging or discharging the battery. This is supposed to be because of expansion or shrinkage of the active materials and the like caused by vibrations or external force. This phenomenon is not good in obtaining required performance of the lead-acid battery. In this respect, in this preferred embodiment, as shown in FIG. 5, a lot of pressure ribs 10i are formed on the battery container body 10, and a lot of pressure ribs 12i are also formed on the lid 12. In the production processes, in putting on the lid 12 with each cell 2 stored in each cell room 13 of the battery container body 10, the pressure ribs 10i and 12i apply pressure force to the electrode plate assembly 20 of each cell 2 in the laminated direction of the electrode plate assembly 20, i.e., in the direction of the arrow W1. Then, in the production processes, the lid 12 is fixed to the battery container body 10 by bonding, welding or the like, with the pressure force applied. Therefore, uniform pressure force can be applied on both of the positive electrode plates 22y and the negative electrode plates 22x constituting the electrode plate assemblies 20. Further, since the pressure ribs 10i and 12i are multiple, the pressure force can be applied with high uniformity. This pressure helps to prevent active materials from being dropped in using the lead-acid battery.

In summary, in this preferred embodiment, since the intercell electrically connecting member 4 has a H-shaped cross section, the first butting end surface 45 of the first side part 41 and the second butting end surface 47 of the second side part 42 of the intercell electrically connecting member 4 are increased in area. Accordingly, the connecting strength of the first butting end surface 45 and the positive strap 31 is secured, and the connecting strength of the second butting end surface 47 and the negative strap 32 is secured.

Further, in welding, the positive strap 31 and the negative strap 32 can be relatively displaced with respect to the intercell electrically connecting member 4 in the extending direction of the partition wall 15, that is, in the direction of the arrow K1, in other words, in the extending direction of the first butting end surface 45 and the second butting end surface 47. Since this relative displacement enables the straps 31 and 32 to be welded at appropriate positions, the connecting strength is effectively secured.

Besides, in this preferred embodiment, as seen from FIG. 2, the intercell electrically connecting member 4 and the positive strap B1 are welded together at two welding portions 4x and 4y in a cross section. Therefore, even when deformation, displacement, expansion or shrinkage generates due to corrosion or the like of the electrode plates 22 or vibrations are applied, it is possible to secure connecting strength at the intercell electrically connecting member 4, and connecting reliability is further improved.

Since the connecting strength is thus increased, even when vibrations or external force is applied, a gap is hardly formed between the intercell electrically connecting member 4 and the partition wall 15 even when vibrations or external force is applied. So, this construction is also advantageous in securing sealing reliability at the boundary between the intercell electrically connecting member 4 and the partition wall 15.

Further, as mentioned in the above, since the intercell electrically connecting member 4 has the shape of H, the inner surface 41i of the first side part 41 which faces to the partition wall 15 is increased in area, and the inner surface 42i of the second side part 42 which faces to the partition wall 15 is increased in area. Thus, the contact area of the intercell electrically connecting member 4 and the partition wall 15 is secured and sealing performance at their boundary is more easily secured.

In addition, because the sealing members 7 are disposed between the partition wall 15 and the intercell electrically connecting member 4, the sealing performance is further secured. Accordingly, in this preferred embodiment, the electrolyte is prevented from invading the intercell between the intercell electrically connecting member 4 and the partition wall 15. Therefore, the provision of the sealing member 7 is advantageous in preventing short circuit between the cells 2 in adjoining cell rooms 13 caused by the entered electrolyte.

As mentioned before, the active materials are sometimes dropped. Although the positive electrode plates 22y and the negative electrode plates 22x are electrically separated from each other by the separators 28, there is a fear that the electrode plates 22 are short-circuited by way of active materials deposited on a bottom surface 13p of each cell room 13. In this respect, in this preferred embodiment, since a gap L1 is formed between lower ends of the electrode plate assembly 20 of each cell 2 and the bottom surface 13p of each cell room 13, as shown in FIG. 1, the fear can be quieted or dismissed.

As described in the above, in this preferred embodiment, the area of each electrode plate 22 is set to be smaller than that of a conventional electrode plate, and the number of electrode plates 22 is increased to compensate the decrease in area. Further, as appreciated from FIG. 3, the electrode plates 22 in one cell 2 are electrically connected in parallel with each other to secure output. This construction contributes to the prevention of a drop in the entire voltage of the lead-acid battery. When this construction is employed, however, because the number of electrode plates 22 is increased, the electrical resistance of portions which collect current from each electrode plate 22 tends to increase, and accordingly, there is a need to employ a method of decreasing the electrical resistance of the current collecting portions.

In this respect, in this preferred embodiment, as appreciated from FIG. 3, the positive strap 31 and the negative strap 32 are respectively formed in a bar shape and extended in the laminated direction of the electrode plates 22, that is, in the direction of the arrow W1. Further, the lug portions 22k of a large number of positive electrode plates 22y are connected in parallel to the bar-shaped positive strap 31 by burying or welding means. Similarly, the lug portions 22k of a large number of negative electrode plates 22x are connected in parallel to the bar-shaped negative strap 32 by burying or welding means. This construction is advantageous in reducing the electrical resistance of the current collecting portions. Further, the bar-shaped intercell electrically connecting member 4 is provided in parallel with the bar-shaped positive strap 31 and the bar-shaped negative strap 32, and connected to each of the positive and negative straps 31 and 32 in face contact. Thus, the intercell electrically connecting member 4 electrically connects the bar-shaped positive strap 31 and the bar-shaped negative strap 32.

Thus, in this preferred embodiment, the construction is not employed in one cell 2 in which current from a lot of electrode plates 22 is collected to a single current path. Therefore, the construction of this preferred embodiment is advantageous in reducing the electrical resistance of the current collecting portions, and accordingly in suppressing a drop in the entire voltage of the lead-acid battery.

Second Preferred Embodiment

Figure 6:
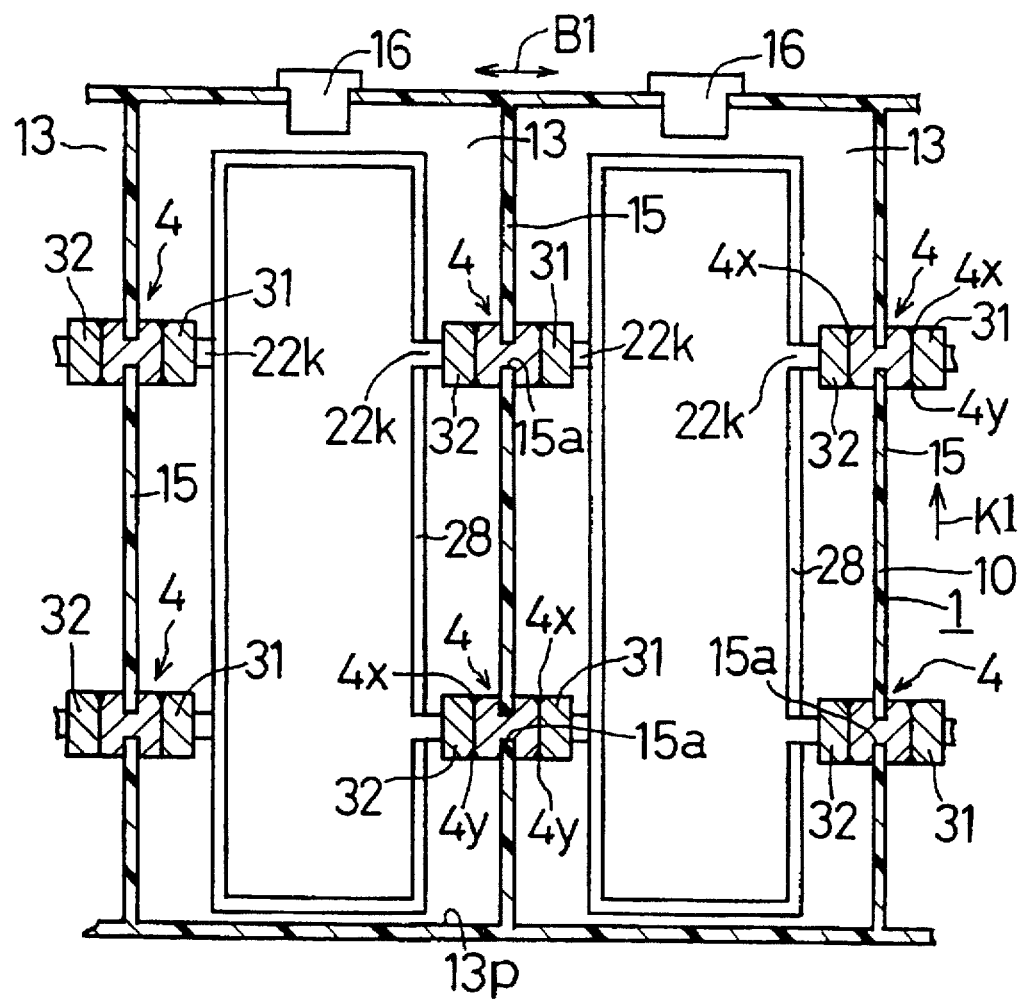
FIG. 6 is a vertical sectional view of the relevant parts of a lead-acid battery according to a second preferred embodiment of the present invention.

A second preferred embodiment of the present invention is shown in FIG. 6. This preferred embodiment has basically the same construction as that of the first preferred embodiment, and exhibits basically the same functions and advantages as those of the first preferred embodiment. The same reference numerals or characters are assigned to the same portions as in the first preferred embodiment.

Different portions from those of the first preferred embodiment will be described in detail hereinafter. As shown in FIG. 6, two holding openings 15a are formed on each partition wall 15 at an upper position and a lower position in the height direction of the battery container 1, i.e., in the direction of the arrow K1 in FIG. 6. An intercell electrically connecting member 4 is engaged with and held by each holding opening 15a of each partition wall 15. So, the intercell electrically connecting members 4 are disposed in parallel at upper and lower positions. In this preferred embodiment, the stability of the cells 2 is improved, and accordingly vibration resistance is enhanced.

Further, although not illustrated in figures, it is possible to form three, four, or more holding openings 15a in parallel in the vertical direction, and make one intercell electrical connecting member 4 held by each holding opening 15a, so that three or more of intercell electrically connecting members 4 are provided in parallel in the vertical direction.

Third Preferred Embodiment

Figure 7:
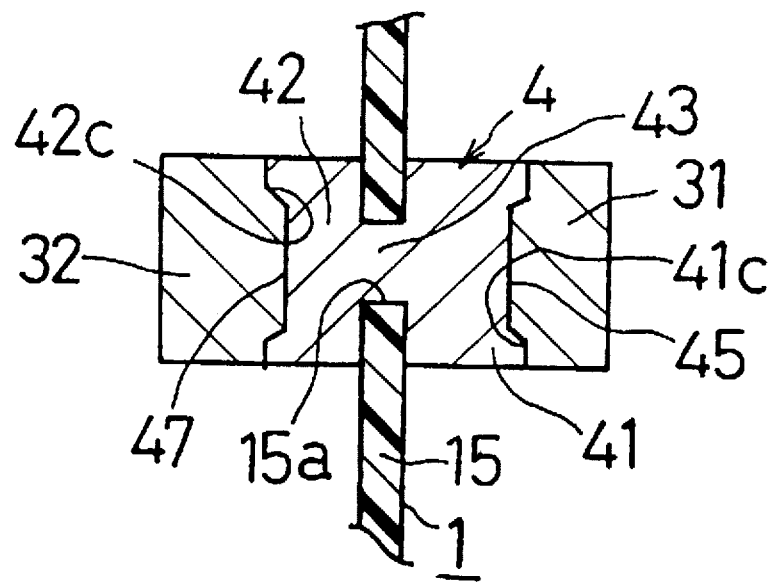
FIG. 7 is an enlarged sectional view of the vicinity of an intercell electrically connecting member according to a third preferred embodiment of the present invention.

A third preferred embodiment is shown in FIG. 7. This preferred embodiment has basically the same construction as that of the first preferred embodiment, and exhibits basically the same functions and advantages as those of the first preferred embodiment.

Now, different portions from those of the first preferred embodiment will be hereinafter described in detail. Similarly to the first preferred embodiment, each intercell electrically connecting member 4 is formed of a lead-based material, and has a H-shaped cross section. The intercell electrically connecting member 4 comprises a first side part 41 having an area-increased butting end surface 45 in a flat plane shape, a second side part 42 having an area-increased second butting end surface 47 in a flat plane shape, and a connecting part connecting the first side part 41 and the second side part Further, in this preferred embodiment, locating portions 41c, 42c, which are concaves or convexes, are formed on the first side part 41 and the second side part 42 of the intercell electrically connecting member 4. Accordingly, it is possible to determine the positions of the connecting surfaces of the intercell electrically connecting member 4, and each of the positive strap 31 and the negative strap 32. Also in this preferred embodiment, the intercell electrically connecting member 4, the positive strap 31, and the negative strap 32 are formed of lead-based materials. So, plastic deformation allows the concaves and convexes to be easily engaged with each other.

Figure 8:
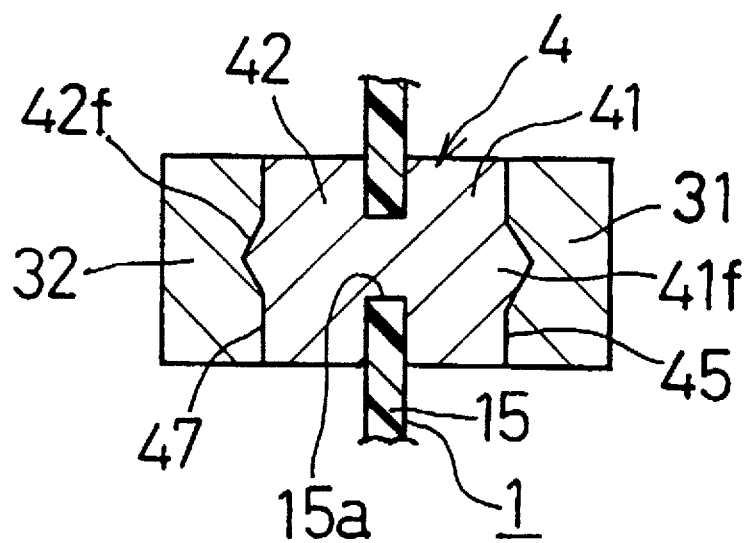
FIG. 8 is an enlarged sectional view of the vicinity of an intercell electrically connecting member according to a modification of the third preferred embodiment of the present invention.

FIG. 8 shows a modification of the part around the intercell electrically connecting member 4 shown in FIG. 7. A locating portion 41f or 42f having a triangular cross section is formed on each of the first side part 41 and the second side part 42 of the intercell electrically connecting member 4. Therefore, it is possible to determine the positions of the connecting surfaces of the intercell electrically connecting member 4, and each of the positive strap 31 and the negative strap 32. In this modification, since vertexes of the triangular locating portions 41f and 42f easily bite into the mating positive strap 31 and the negative strap 32, this is advantageous in securing accurate physical and electrical connection.

Fourth Preferred Embodiment

Figure 9:
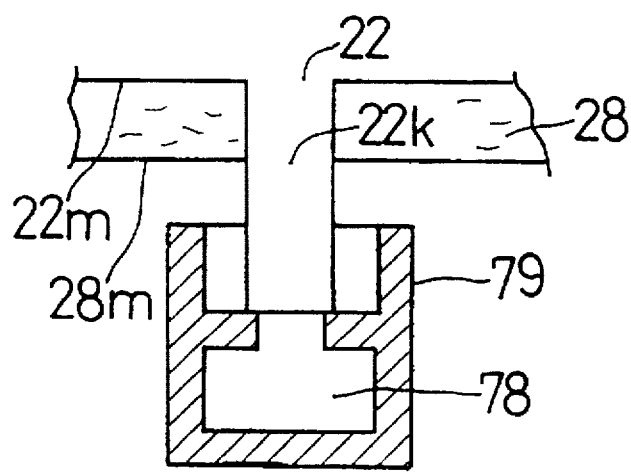
FIG. 9 is a schematic sectional view showing that lug portions of electrode plates are placed in a cavity of a die for molding an intercell electrically connecting member according to a fourth preferred embodiment of the present invention.
Figure 10:
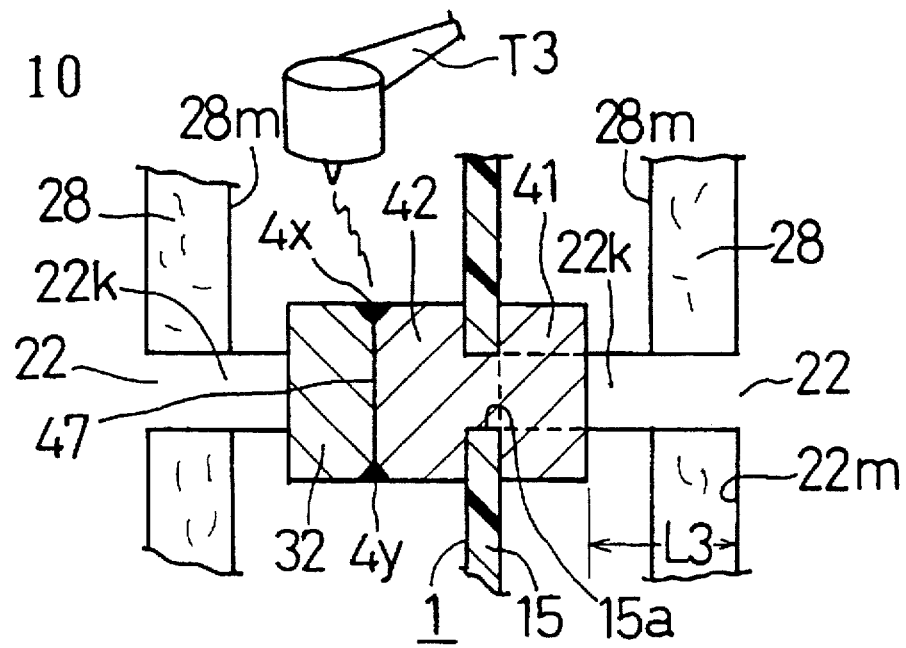
FIG. 10 is a sectional view showing the way of arranging the intercell electrically connecting member in which the lug portions are buried shown in FIG. 9.

A fourth preferred embodiment is shown in FIGS. 9 and 10. This preferred embodiment has basically the same construction as that of the first preferred embodiment, and exhibits basically the same functions and advantages as those of the first preferred embodiment.

Now, different portions from those of the first preferred embodiment will be described in detail. In this preferred embodiment, as shown in FIG. 9, each intercell electrically connecting member 4 is formed as follows. First, electrode plates 22 each having a lug portion 22k in a tongue shape, and a small molding die 79 having a H-shaped cavity 78 are prepared, and the lug portions 22k are placed in the cavity 78 of the molding die 79. Second, molten lead-based metal, which is a conductive material, is introduced into the cavity 78 and solidified. Thus, the lug portions 22k are integrally buried in a first side part 41 of the intercell electrically connecting member 4. Solidifying shrinkage of the molten metal is expected to exhibit an effect of fastening the lug portions 22k.

Then, as shown in FIG. 10, a negative strap 32 is butt welded by a welding means T3 to a second butting end surface 47 of a second side part 42 of the intercell electrically connecting member 4 held at the partition wall 15. In this preferred embodiment, since the lug portions 22k of the electrode plates 22 of an electrode plate assembly 20 are directly buried in the intercell electrically connecting member 4, one electrode strap is not required. This construction is advantageous in diminishing the distance L3 between the intercell electrically connecting member 4 and the sides 22m of the electrode plates 22, as shown in FIG. 10.

Owing to the distance reduction, the length of the current path is decreased, and as a result, the electrical resistance of the current path is reduced, because the electrical resistance of the current path is proportional not only to its specific resistance but also to the length of the current path. Therefore, this construction contributes to the reduction in the internal resistance of the current collecting portion of the lead-acid battery, and moreover to the reduction in the size of the lead-acid battery. Further, it is possible to expect an effect of reinforcing the intercell electrically connecting member 4 with the buried lug portions 22k, depending on the materials of the intercell electrically connecting member 4 and the lug portions 22k.

Further, in some cases, the burial may be conducted by holding the lug portions 22k between a plurality of conductive plates, and compressing the plates in the thickness direction by forging and the like so that the lug portions 22k are pressure connected to and buried in the plates.

Fifth Preferred Embodiment

Figure 11:
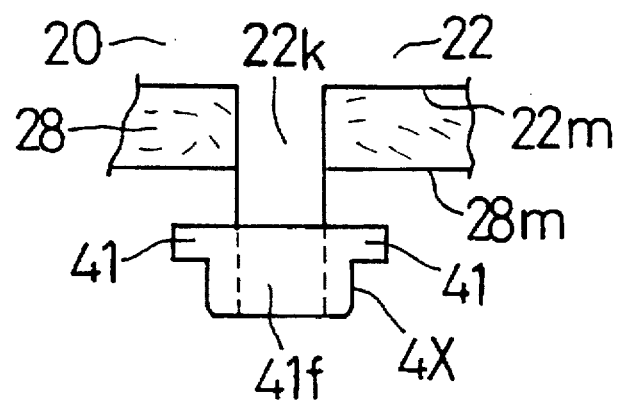
FIG. 11 is a schematic view of a divided part in which lug portions are buried according to a fifth preferred embodiment of the present invention.
Figure 12:
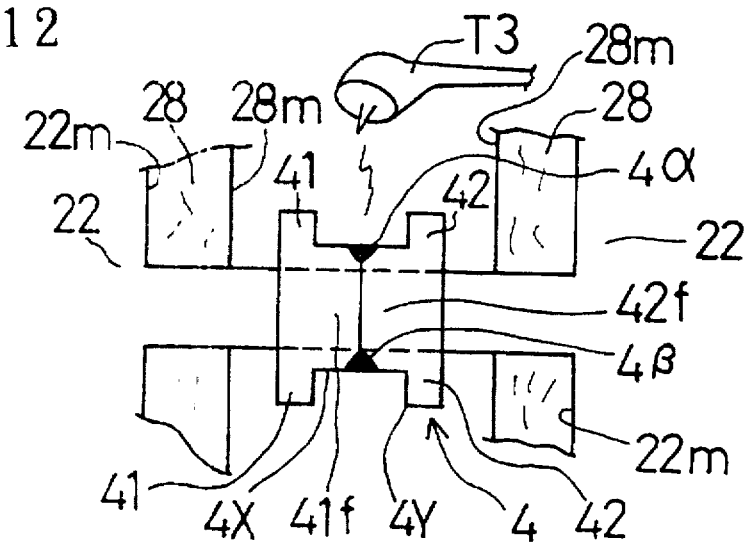
FIG. 12 is a schematic view showing that an intercell electrically connecting member is formed by connecting two divided parts in which lug portions are buried according to the fifth preferred embodiment of the present invention.
Figure 13:
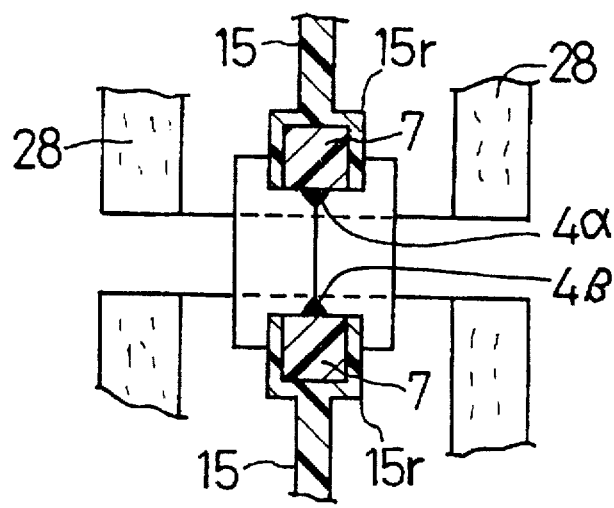
FIG. 13 is a schematic sectional view showing that the intercell electrically connecting member is held at a holding opening of a partition wall by connecting the two divided parts in which the lug portions are buried, according to the fifth preferred embodiment of the present invention.

A fifth preferred embodiment is shown in FIGS. 11 to 13. This preferred embodiment has basically the same construction as that of the first preferred embodiment, and exhibits basically the same functions and advantages as those of the first preferred embodiment.

Now, different portions from those of the first preferred embodiment will be hereinafter described in detail. In this preferred embodiment, first, as shown in FIG. 11, tongue-shaped lug portions 22k of either of positive electrode plates and negative electrode plates 22 constituting one electrode plate assembly 20 are buried in and held by a first divided part 4X formed of a lead-based material beforehand. In some cases, the lug portions 22k may be welded to the first divided part 4X. The first divided part 4X comprises a first central portion 41f, and a first side part 41 which protrudes from the first central portion 41f in each direction of departing from each other.

Further, as shown in FIG. 12, tongue-shaped lug portions 22k of the other of the positive electrode plates and the negative electrode plates 22 are connected to a second divided part 4Y formed of a lead-based material beforehand. This second divided part 4Y is laterally symmetrical to the first divided part 4X. The second divided part 4Y comprises a second central portion 42f, and a second side part 42 which protrudes from the second central portion 42f in each direction of departing from each other.

Then, as shown in FIG. 12, the central portion 41f of the first divided part 4X and the central portion 42f of the second divided part 4Y are butted against each other and welded together by forming welding portions 4α, 4β by a welding means T3. Thereby, an intercell electrically connecting member 4 having a H-shaped cross section is integrally formed.

As shown in FIG. 13, holders 15r each having a hollow rectangular cross section without one side are formed at the partition wall 15 so as to face to each other. The intercell electrically connecting member 4 is engaged with the partition wall 15 by being relatively displaced in a perpendicular direction to the plane of paper showing FIG. 13, and held by the partition wall 15. Further, a liquid sealant is filled in the cavities of the holders 15r and solidified, thereby applying sealing members 7. These sealing members 7 secure sealing performance at the boundary of two cell rooms 13 adjoining through the partition wall 15, and accordingly short circuit between the cell 2 stored in the adjoining two cell rooms 13 can be more effectively prevented.

Sixth Preferred Embodiment

Figure 14:
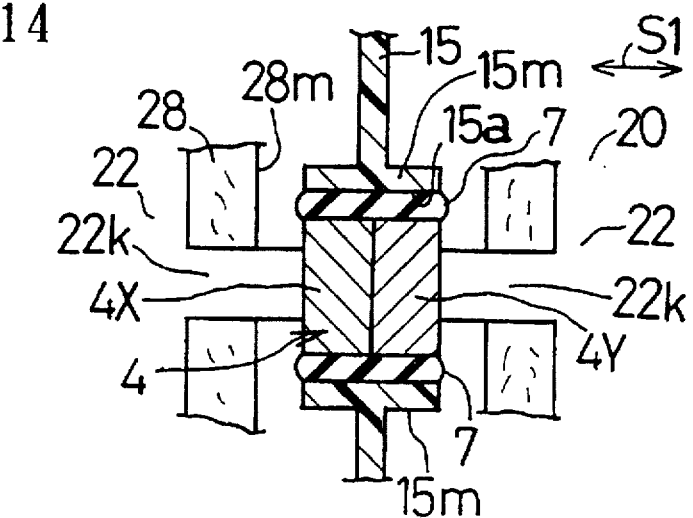
FIG. 14 is a schematic sectional view showing that an intercell electrically connecting member is held by a partition wall by connecting two divided parts in which lug portions are buried, according to a sixth preferred embodiment of the present invention.
Figure 15:
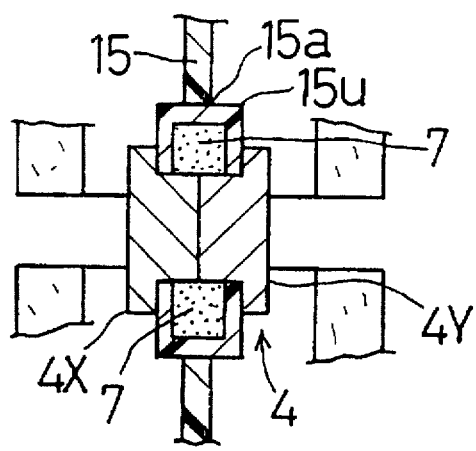
FIG. 15 is a schematic sectional view showing that an intercell electrically connecting member is held by a partition wall by connecting two divided parts in which lug portions are buried, according to a modification of the sixth preferred embodiment of the present invention.
Figure 16:
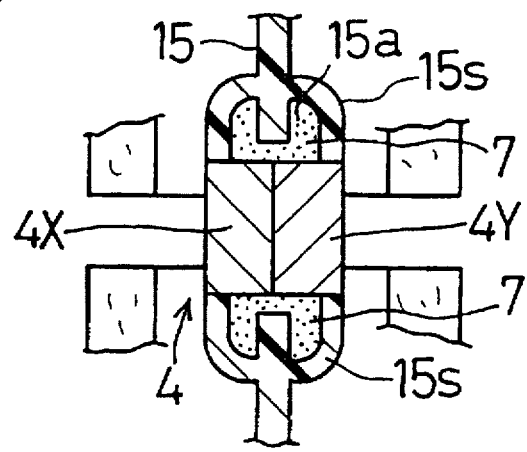
FIG. 16 is a schematic sectional view showing that an intercell electrically connecting member is held by a partition wall by connecting two divided parts in which lug portions are buried, according to another modification of the sixth preferred embodiment of the present invention.

A sixth preferred embodiment and its modifications are shown in FIGS. 14 to 16. This preferred embodiment and its modifications have basically the same construction as that of the first preferred embodiment, and exhibit basically the same functions and advantages as those of the first preferred embodiment.

Now, different portions from those of the first preferred embodiment will be hereinafter described. In this preferred embodiment and its modifications, as shown in FIG. 14, lug portions 22k are buried in each of a first divided part 4X and a second divided part 4Y, thereby securing the connecting strength of the lug portions 22k and each of the first divided part 4X and the second divided part 4Y. The first divided part 4X and the second divided part 4Y respectively have a longitudinal cross section.

In a construction shown in FIG. 14, holders 15m are formed at a holding opening 15a of each partition wall 15 in a perpendicular direction to the partition wall 15 beforehand. The first divided part 4X and the second divided part 4Y are disposed at the holding opening 15a and welded together with these divided parts 4X and 4Y butting against each other by forming welding portions, thereby forming an intercell electrically connecting member 4. Moreover, sealing members 7 are disposed between the holders 15m of the partition wall 15 and the intercell electrically connecting member 4. In this preferred embodiment, as appreciated from FIG. 12, since adjoining electrode plate assemblies 20 are directly connected to each other by way of the first divided part 4X and the second divided part 4Y, the current path can be shortened in the direction of the arrow 1 in FIG. 14, and accordingly the internal resistance of the lead-acid battery can be reduced.

Since the sealing members 7 are soft or relatively soft, even when vibrations or displacement are acted on the electrode plate assemblies 20, elastic deformation of the sealing members 7 securely provides allowance to the vibrations or displacement. In this respect, the provision of the sealing members 7 is also advantageous in securing the connecting strength.

In a construction shown in FIG. 15, holders 15u each having a hollow rectangular cross section without one side are formed beforehand at a holding opening 15a of each partition wall 15 so as to face to each other. Then a liquid sealant is filled in the space of the holders 15u and solidified, thereby forming sealing members 7.

In a construction shown in FIG. 16, holders 15s each having an approximately E-shaped cross section are formed beforehand at a holding opening 15a of each partition wall 15 so as to face to each other. Then a liquid sealant is filled in the space of the holders 15s and solidified, thereby forming sealing members 7.

Seventh Preferred Embodiment

Figure 17:
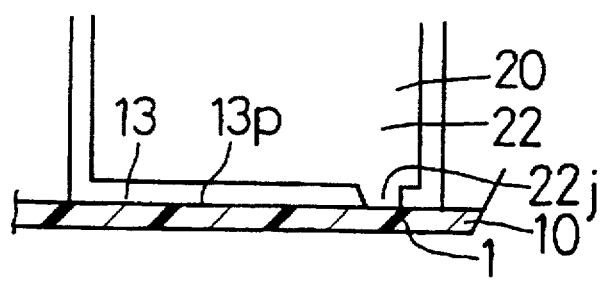
FIG. 17 is a side schematic view showing that a leg portion of an electrode plate is grounded on a bottom surface of one cell room according to a seventh preferred embodiment of the present invention.
Figure 18:
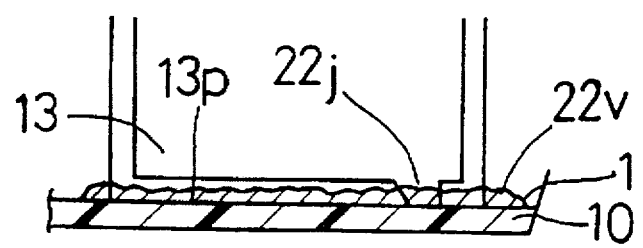
FIG. 18 is a side schematic view showing that a leg portion of an electrode plate is grounded on and bonded to a bottom surface of one cell room according to a modification of the seventh preferred embodiment of the present invention.
Figure 19:
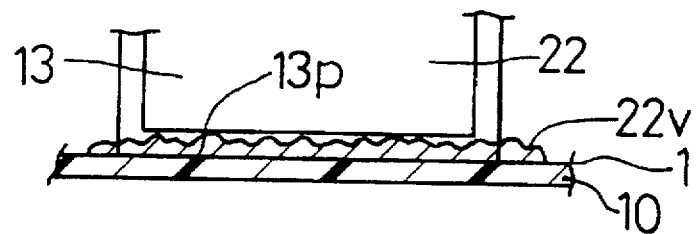
FIG. 19 is a side schematic view showing that an electrode plate having no leg portion is bonded to a bottom surface of one cell room according to another modification of the seventh preferred embodiment of the present invention.

A seventh preferred embodiment is shown in FIGS. 17 to 19. This preferred embodiment has basically the same construction as that of the first preferred embodiment, and exhibits basically the same functions and advantages as those of the first preferred embodiments.

Now, different portions from those of the first preferred embodiment will be hereinafter described in detail. In this preferred embodiment, as shown in FIG. 17, either of positive electrode plates and negative electrode plates 22 of one electrode plate assembly 20 respectively have a leg portion 22j in a tongue shape. The leg portions 22j are grounded on a bottom surface 13p of each cell room 13 of the battery container 1 in the production processes. Accordingly, it is possible to hold the electrode plates 22 more securely and to improve vibration resistance.

Further, as shown in FIG. 18, in addition to the fact that the leg portions 22j are grounded on the bottom surface 13p of each cell room 13 of the battery container 1, the leg portions 22j can be fixed to the bottom surface 13p by an anchor bond 22v, with the leg portions 22j grounded, whereby the electrode plates 22 are more securely held and vibration resistance is further improved.

Alternatively, as shown in FIG. 19, either of the positive electrode plates and the negative electrode plates 22 may be glued to the bottom surface 13p of each cell room 13 of the battery container 1 by the anchor bond 22v, without forming leg portions on the electrode plate assemblies 20.

Eighth Preferred Embodiment

Figure 20:
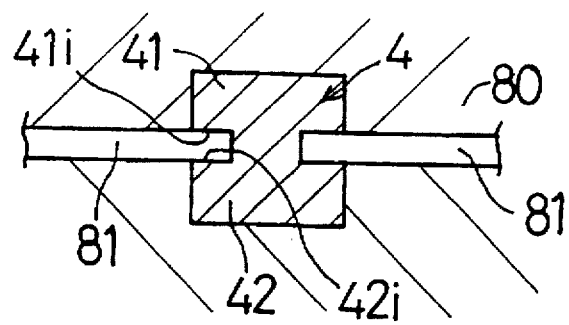
FIG. 20 is a cross sectional view of a die for molding a partition wall having a die cavity in which an intercell electrically connecting member is placed.
Figure 21:
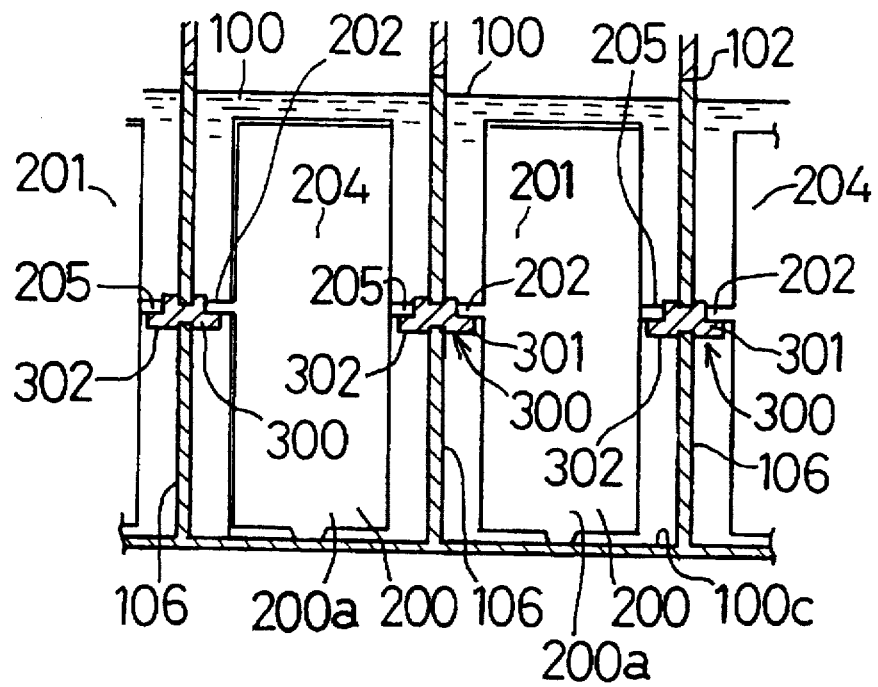
FIG. 21 is a vertical sectional view of the relevant parts of a conventional lead-acid battery.

An eighth preferred embodiment is shown in FIG. 20. This preferred embodiment has basically the same construction as that of the first preferred embodiment, and exhibits basically the same functions and advantages as those of the first preferred embodiment. Now, different portions from those of the first preferred embodiment will be hereinafter described in detail. In this preferred embodiment, as shown in FIG. 20, with intercell electrically connecting members 4 placed in cavities 81 of a die 80 for molding a battery container body 10, a liquid resin is filled in the cavities 81 and solidified, thereby forming a battery container body 10 having partition walls 15. This construction enables an increase in the integrity of each partition wall 15 and each intercell electrically connecting member 4, and accordingly secures sealing performance at the boundary between each partition wall 15 and each intercell electrically connecting member 4. In this case, if glue is spread on an inner surface 41i of a first side part 41 and an inner surface 42i of a second side part 42 of each intercell electrically connecting member 4 beforehand, the integrity and sealing performance is more improved. Forming means may be any known means such as injection molding, compression molding.

The present invention is not limited to the above preferred embodiments shown in the drawings. This invention may be practiced or embodied in still other ways without departing from the spirit or essential character thereof. For instance, the material of the intercell electrically connecting member is not limited to lead or lead alloys, and can be appropriately selected in accordance with the kinds of batteries.

What is claimed is:

1. A battery, comprising:
   a container having a plurality of cell rooms and a partition wall for separating adjoining cell rooms;
   cells stored respectively in said cell rooms of said container, and respectively comprising an electrode plate assembly having a separator and electrode plates which are laminated to face to each other with said separator sandwiched therebetween;
   a first current collector which is electrically connected to electrode plates in one of two cells adjoining through said partition wall;
   a second current collector which is electrically connected to electrode plates in the other of said two cells adjoining through said partition wall; and
   an intercell electrically connecting member held by said partition wall, formed of a conductive material, and electrically connecting said cells adjoining through said partition wall in series or in parallel,
   said intercell electrically connecting member including,
   a first butting end surface in an approximately flat plane shape disposed along one surface of said partition wall, said first butting end surface facing and connected to said first current collector with a whole face of said first butting end surface and said first current collector butting against each others, and
   a second butting end surface in an approximately flat plane shape disposed opposite said first butting end surface and along another surface of said partition wall, said second butting end surface facing and connected to said second current collector with a whole face of said second butting end surface and said second current collector butting against each other.

2. A battery according to claim 1, wherein said intercell electrically connecting member comprises a first side part having said first butting end surface, a second side part disposed to face said first side part and having said second butting end surface, and a connecting part connecting said first side part and said second side part,
   said first side part, said second side part and said connecting part together constituting an H-shaped cross section, and
   said partition wall of said container engaged with a groove constituting said H-shaped cross section of said electrically connecting member.

3. A battery according to claim 1, wherein said intercell electrically connecting member has an H-shaped cross section and extends in a bar shape in a laminated direction of said electrode plate assembly, and
   said first current collector and said second current collector are respectively extended in a bar shape in the laminated direction of said electrode plate assembly, and disposed in parallel with said intercell electrically connecting member.

4. A battery according to claim 3, wherein a face of said first butting end surface of said intercell electrically connecting member is connected to contact a face of said first current collector, and a face of said second butting end surface of said intercell electrically connecting member is connected to contact a face of said second current collector.

5. A battery according to claim 1, wherein said intercell electrically connecting member is formed by connecting a first divided part formed of a conductive material and a second divided part formed of a conductive material, with said first divided part and said second divided part butting against each other.

6. A battery according to claim 5, wherein said first divided part and said second divided part respectively have a T-shaped cross section,
   said intercell electrically connecting member formed by butt connecting said first divided part and said second divided part has an H-shaped cross section, and
   said partition wall is engaged with a groove constituting said H-shaped cross section of said intercell electrically connecting member.

7. A battery according to claim 1, wherein said first butting end surface of said intercell electrically connecting member is connected to said first current collector by welding portions formed at opposite positions to each other, and
   said second butting end surface of said intercell electrically connecting member is connected to said second current collector by welding portions formed at opposite positions to each other.

8. A battery according to claim 1, wherein said intercell electrically connecting member has a locating portion in either of a concave shape or a convex shape to be engaged with at least one of said first current collector and said second current collector.

9. A battery according to claim 8, wherein said locating portion has a vertex to bite into said at least one of said first current collector and said second current collector.

10. A battery according to claim 1, wherein said container comprises:
    a battery container body having said plurality of cell rooms and said partition wall for separating adjoining cell rooms; and
    a lid placed on an opening of said battery container body;
    at least one of said battery container body and said lid has a plurality of pressure ribs in a projection shape for applying pressure force to said electrode plate assemblies of said cells stored in said cell rooms in a laminated direction of said electrode plate assemblies.

11. A battery according to claim 1, wherein said partition wall has a holding opening in a slot shape extending in a laminated direction of said electrode plate assembly, and a projection formed near said holding opening functioning as a reinforcing rib, and
    said intercell electrically connecting member is engaged with said holding opening of said partition wall by being relatively displaced in a laminated direction of said electrode plate assembly.

12. A battery according to claim 1, wherein a sealing member is provided at a boundary between said intercell electrically connecting member and said partition wall wherein liquid sealing performance between said intercell electrically connecting member and said partition wall is improved.

13. A battery according to claim 1, wherein a sealing member is provided at a boundary between said intercell electrically connecting member and said partition wall wherein liquid sealing performance between said intercell electrically connecting member and said partition wall is improved,
    said sealing member is formed by solidifying a fluid sealant, and said partition wall has a projection protruding in the laminated direction of said electrode plate assembly and suppressing said fluid sealant from spreading excessively.

14. A battery according to claim 1, wherein said partition wall has a holding opening for holding said intercell electrically connecting member,
   a peripheral portion of said holding opening of said partition wall has a holder having a hollow rectangular cross section without one side and engaged with said intercell electrically connecting member, and
   a sealing member is filled in a space formed by said holder and said intercell electrically connecting member.

15. A battery according to claim 1, wherein said partition wall has a holding opening for holding said intercell electrically connecting member,
   a peripheral portion of said holding opening of said partition wall has a holder having an E-shaped cross section and engaged with said intercell electrically connecting member, and
   a sealing member is filled in a space formed by said holder and said intercell electrically connecting member.

16. A battery according to claim 1, wherein said electrode plates constituting said electrode plate assembly are held in a manner in which a gap is formed between said electrode plates and a bottom surface of said cell room of said container.

17. A battery according to claim 1, wherein said electrode plates constituting said electrode plate assembly have a leg portion grounded on a bottom surface of said cell room of said container, and
   said electrode plates are held in a manner in which a gap having the same distance as the length of said leg portion is formed between said electrode plates and said bottom surface of said cell room.

18. A battery according to claim 1, wherein said electrode plates constituting said electrode plate assembly have a leg portion grounded on a bottom surface of said cell room of said container, and
   said leg portion is fixed to said bottom surface of said cell room by bonding means.

19. A battery according to claim 1, wherein said partition wall is molded integrally with said intercell electrically connecting member by using a molding die having a cavity for molding a partition wall, introducing resin to said cavity with said intercell electrically connecting member placed in said cavity of said molding die, and solidifying said resin, wherein the integrity of said partition wall and said intercell electrically connecting member is improved.

20. A battery according to claim 1, wherein said electrode plate assemblies in cells adjoining through said partition wall are electrically connected to each other in series by said intercell electrically connecting member.

21. A battery according to claim 1 wherein said intercell electrically connecting member, said first current collector, and said second current collector are respectively formed of a lead-based conductive material.

22. A battery according to claim 1, wherein said electrode plate assembly comprises an insulating separator in a sheet shape, and a positive electrode plate and a negative electrode plate which face each other with said separator sandwiched therebetween,
   said positive electrode plate includes a positive leadbased active material, and said negative electrode plate includes a negative lead-based active material.

23. A battery, comprising:
   a container having a plurality of cell rooms and a partition wall for separating adjoining cell rooms;
   cells stored respectively in said cell rooms of said container, and respectively comprising an electrode plate assembly having a separator and electrode plates which are laminated to face to each other with said separator sandwiched therebetween; and
   an integral intercell electrically connecting member held by said partition wall, formed of a conductive material, and electrically connecting two cells adjoining through said partition wall in series or in parallel,
   said integral intercell electrically connecting member including,
   a first side portion disposed on a side of one of said two adjoining cells and electrically connected to said electrode plates in said one of said two adjoining cells,
   a second side portion disposed on a side of the other of said two adjoining cells and electrically connected to said electrode plates in said other of said two adjoining cells, and
   a connecting portion connecting an intermediate portion of said first side portion and an intermediate portion of said second side portion,
   said first side portion, said second side portion, and said connecting portion constituting an H-shaped cross section and where said first side portion, said second side portion, and said connecting portion each extend in a bar shape to keep a shape of said H-shaped cross section of said integral intercell electrically connecting member constant.

24. A battery according to claim 23, wherein said electrode plates constituting said electrode plate assembly have a lug portion, and said lug portion of said electrode plates is integrally buried in said intercell electrically connecting member.

25. A battery according to claim 23, wherein said intercell electrically connecting member having said H-shaped cross section is extended in a bar shape in a laminated direction of said electrode plate assemblies.

26. A battery according to claim 23, wherein a sealing member is disposed at a boundary between said intercell electrically connecting member and said partition wall.

27. A battery according to claim 26, wherein said sealing member is formed by solidifying a fluid sealant, and said partition wall has a projection protruding in a laminated direction of said electrode plate assembly and suppressing said fluid sealant from spreading excessively.

28. A battery according to claim 23, wherein said first side part, said second side part and said connecting part of said intercell electrically connecting member constitute an H-shaped cross section.

29. A battery, comprising:
   a container having a plurality of cell rooms and a partition wall for separating adjoining cell rooms;
   cells stored respectively in said cell rooms of said container, and comprising an electrode plate assembly having a separator, and electrode plates which have a lug portion and are laminated so as to face to each other with said separator sandwiched therebetween; and
   an intercell electrically connecting member held by said partition wall, formed of a conductive material, and electrically connecting cells adjoining through said partition wall in series or in parallel,
   said lug portions of said electrode plates being buried in said intercell electrically connecting member.

* * * * *